United States Patent
Greutert et al.

[11] 3,980,563
[45] Sept. 14, 1976

[54] SHAPED SIEVE BODY

[75] Inventors: Albert Greutert, Sonnhalde, Switzerland; Ernst Heidborn, Ifang, Germany

[73] Assignee: Interelectric AG, Sonnhalde, Switzerland

[22] Filed: Oct. 27, 1972

[21] Appl. No.: 301,373

[30] Foreign Application Priority Data
Oct. 28, 1971  Germany............................ 2153901

[52] U.S. Cl............................. 210/232; 210/380 R; 210/497 R; 220/81 R
[51] Int. Cl.²......................................... B01D 25/04
[58] Field of Search ........... 210/232, 321, 380, 483, 210/497, 381, 382, 493; 220/75, 80, 81 R

[56] References Cited
UNITED STATES PATENTS

| | | | |
|---|---|---|---|
| 773,945 | 11/1904 | Kronauer | 220/75 |
| 1,625,376 | 4/1927 | Roberts | 210/380 |
| 2,533,402 | 12/1950 | Schmitz, Jr. | 210/497 |
| 3,444,791 | 5/1969 | Honsel | 210/497 |
| 3,591,010 | 7/1971 | Pall et al. | 210/493 |
| 3,612,282 | 10/1971 | Cheng | 210/321 |

FOREIGN PATENTS OR APPLICATIONS

| | | | |
|---|---|---|---|
| 2,041,904 | 3/1972 | Germany | 220/81 R |
| 1,099,464 | 2/1961 | Germany | 210/380 |

*Primary Examiner*—Charles N. Hart
*Assistant Examiner*—R. G. Mukai
*Attorney, Agent, or Firm*—B. P. Fishburne, Jr.

[57] ABSTRACT

A shaped sieve body that is made of a perforated metal foil, which is formed to a shaped body. Said body comprises at least one foil element provided along its connecting edges with anchoring means that are embedded in plastics. The foil element has a form allowing to spread said foil element in a plane.

6 Claims, 9 Drawing Figures

SHAPED SIEVE BODY

BACKGROUND OF THE INVENTION

For numerous appliances, for example fruit juice centrifuges, coffee filters and the like, shaped sieve bodies are used whose effective portion consists of metal foils provided with perforations.

It is already known to make such sieve bodies galvanoplastically on a die, said die having the same form as the finished sieve body. However, manufacturing such shaped sieve bodies is rather expensive, since the dies must be regenerated after being used several times.

It is already known to make shaped sieve bodies from a plurality of sieve segments by welding or soldering thereof. However, this leads to embrittling of the sieve segments, generally made of hard nickel, by local heating. Also, a weld seam may have interruptions which provide undesirable leaks in the shaped sieve body. Moreover, in the overlapping welded regions residues may be deposited which are difficult to remove and represent a source of bacteria. Soldered or welded sieve bodies do not have a clean appearance und usually must be balanced.

SUMMARY AND OBJECTS OF THE INVENTION.

It is an object of the invention to provide a shaped sieve body which has a high strength and a pleasant appearance and may be easily cleaned.

It is another object of the invention to provide a shaped sieve body which is easy in manufacture and which consists of metal foil elements which may be made galvanoplastically on a plane die.

These and other objects will be achieved by a sieve shaped body comprising at least one perforated metal foil as sieve surface, which foil has a form allowing it to be spread in a plane and which is provided along its connecting edges with anchoring means which are embedded in plastics.

According to a specific embodiment the metal foil is composed of three sieve segments.

The anchoring means preferably form bent regions of the connecting edges. Such anchoring means are easy to manufacture.

According to a specific embodiment the bent regions extend over a substantial portion of the connecting edges and the non-bent regions are provided with centring and connecting means. This guarantees that the individual sieve segments of the shaped body lie in the correct position with respect to each other on embedding the edges with plastic so that the shaped body may be made with low dimensioning tolerances.

The centring and connecting means may be holes which when the sieve segments adjacently overlap each other are connected by rivets.

The centring and connecting means may alternatively be hooks and holes at the non-bent regions.

Preferably, the end edges of the metal foil are also embedded in plastic.

When using the sieve shaped body for fruit juice centrifuges it is favourable to bend the connecting edges outwardly. Furthermore, it should then be attempted to shape the plastic embeddings in such a manner that the latter form with the inside of the metal foil a continuous surface.

A sieve shaped body according to the invention which is particularly easy to make and is intended for funnel-shaped coffee filters consists in that the metal foil forms a single butterfly-shaped sieve segment and that the connecting edges extend along the V-shaped edges of the segment.

The sieve segments are preferably made galvanoplastically. In this manner it is simple to provide anchoring perforations in the edges at the same time and to make edges which are thicker than the perforation regions.

The invention will be explained hereinafter with reference to several examples of embodiment with the aid of the schematic drawings.

DESCRIPTION OF PREFERRED EMBODIMENTS.

Figure 1:
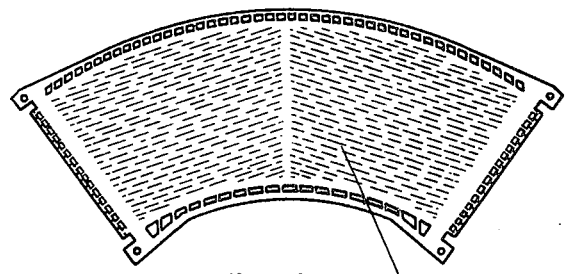
FIG. 1 is a plan view of a sieve segment for a three-part metal foil of a sieve shaped body.
Figure 2:
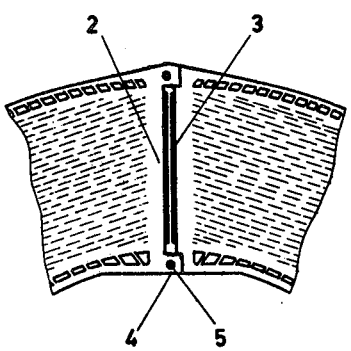
FIG. 2 is a plan view of the joint between two adjacent sieve segments according to FIG. 1.
Figure 3:
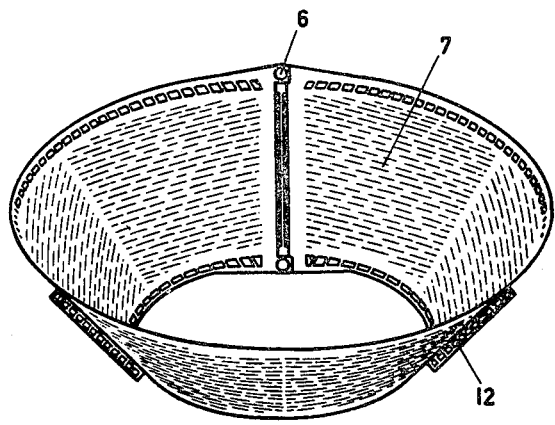
FIG. 3 is a perspective view of the assembled perforated metal foil comprising three sieve segments.
Figure 4A:
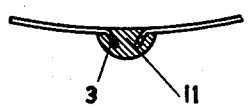
FIG. 4a is a cross-section through the region of two adjoining connecting edges embedded in plastic.
Figure 4:
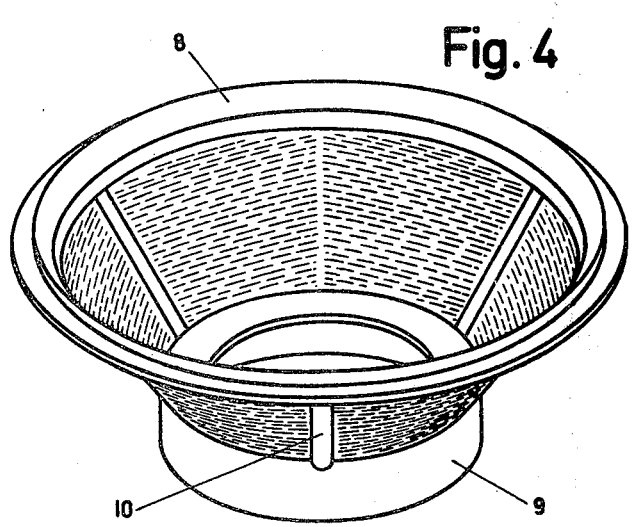
FIG. 4 is a perspective view of a finished sieve shaped body.

The sieve shaped body shown as a whole in FIG. 4 and in details in FIG. 1 to 3 and 4 a consists of three sieve segments 1 which are provided except for the edge with elongated perforations. As is apparent from FIG. 1 to 3 the connecting edges 2 comprise a relatively long center region which is angled with respect to the sieve segment and comprises anchoring perforations and non-angled overlapping regions 4, each provided with a centering hole 5 at the corners of the connecting edges 2. The individual sieve segments are connected together by means of rivets 6. forming with holes 5 centering and connecting means such that the angled edge regions forming anchoring regions 3 are spaced from each other. It is apparent in particular from FIG. 3 that the angled regions are provided with anchoring perforations 12 to guarantee an intimate and strong connection of these regions to the plastic embedding 11.

FIG. 4 a shows that the plastic embedding at the inside of the assembled metal foil forms a continous flush surface so that the inside has no irregularities.

It may be seen that the end edges of the frustro-conical metal foil are also provided with anchoring perforations. These are embedded at the upper end edge 8 and at the lower end edge 9 with plastic, simultaneously with the plastic embedding at the joint 10 of the segments.

FIGS. 5 to 8 show a coffee filter insert and details thereof.

Figure 5:
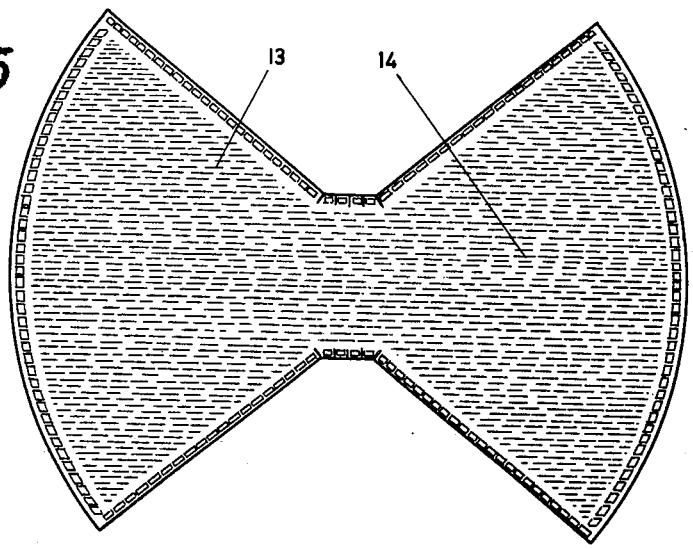
FIG. 5 shows a butterfly-shaped metal foil for a coffee filter.
Figure 6:
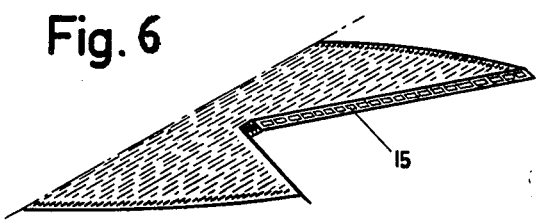
FIG. 6 shows one half of the metal foil according to FIG. 5 with bent connecting edges.
Figure 7:
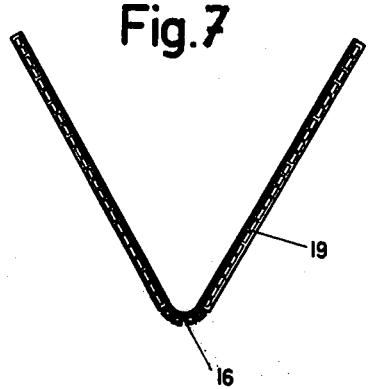
FIG. 7 is a cross-section through the finished folded metal foil according to FIG. 5.
Figure 8:
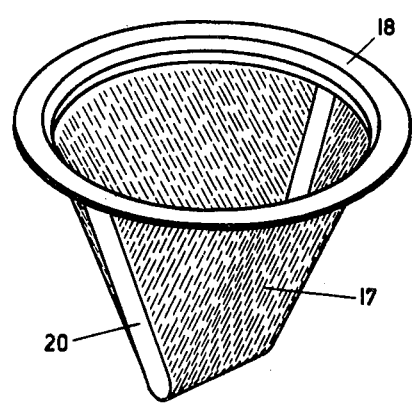
FIG. 8 shows a finished sieve shaped body as coffee filter insert.

As is shown in FIG. 5 the metal foil forms a single butterfly-shaped sieve segment 14 which is provided with elongated perforations 13. The entire edge of said sieve segment is provided with anchoring perforations 15 which are greater in area than the perforations 13. The butterfly-shaped sieve segment 14 is made galvanoplastically on a flat die. When the segment is finished the connecting edges defining the straight portions of the sieve segment are bent through less than a right angle, as shown in FIG. 6. The segment is then bent round the shortest center line 16, as shown in FIG. 7 until the connecting edges are adjacent each other with their anchoring perforations and overlap. The whole is then embedded with plastic along the end edge 18 and the connecting edges 20.

The sieve shaped bodies according to the invention are distinguished by a high mechanical stability and strength and are easy to manufacture.

We claim:

1. A shaped sieve body comprising at least one perforated metal foil segment having opposite end portions adapted to be brought together for the formation of said sieve body, anchoring means on said end portions, and a plastic connecting member for said end portions having said anchoring means embedded therein with the anchoring means and end portions in spaced apart relationship within said plastic connecting member.

2. A shaped sieve body according to claim 1, wherein said anchoring means comprises angled extensions on said end portions extending laterally of the plane of the shaped sieve body.

3. A shaped sieve body according to claim 2, wherein said extensions project outwardly from the shaped sieve body.

4. A shaped sieve body according to claim 1, wherein the plastic connecting member has an interior surface arranged substantially flush with the interior surface of the sieve body and continuous therewith.

5. A shaped sieve body according to claim 1, and a plurality of perforated metal foil segments each having opposite end portions adapted to be brought together for the formation of said sieve body, said anchoring means on the end portions of each segment, and said plastic connecting members joining the adjacent end portions of all of the segments to form a unitary shaped sieve body with the anchoring means of adjacent segments embedded in said plastic connecting members in said spaced apart relationship.

6. A shaped sieve body according to claim 1, and said end portions have a somewhat greater thickness than the remainder of said metal foil segment.

* * * * *